(12) United States Patent
Gupta et al.

(10) Patent No.: US 12,423,445 B1
(45) Date of Patent: Sep. 23, 2025

(54) IDENTIFYING MATCHING VIRTUAL RESOURCES

(71) Applicant: Citibank, N.A., New York, NY (US)

(72) Inventors: Manish Gupta, Pune (IN); Mrinal Kanti Bhattacharya, Pune (IN); Abhishek Dayya, Pune (IN)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/174,560

(22) Filed: Apr. 9, 2025

(51) Int. Cl.
G06F 21/57 (2013.01)
G06F 21/55 (2013.01)
G06F 21/60 (2013.01)

(52) U.S. Cl.
CPC ......... *G06F 21/577* (2013.01); *G06F 21/552* (2013.01); *G06F 21/606* (2013.01)

(58) Field of Classification Search
None
See application file for complete search history.

(56) References Cited

U.S. PATENT DOCUMENTS

| 5,933,498 A | * | 8/1999 | Schneck | G06F 21/72 705/54 |
| 2020/0349054 A1 | * | 11/2020 | Dai | H04L 9/3239 |
| 2021/0357498 A1 | * | 11/2021 | McEachern | G06F 21/552 |

FOREIGN PATENT DOCUMENTS

WO   WO-9725798 A1 * 7/1997 ......... G06F 21/6209

\* cited by examiner

*Primary Examiner* — Paul R Fisher
(74) *Attorney, Agent, or Firm* — Perkins Coie LLP

(57) ABSTRACT

Systems and methods for assessing vulnerability of virtual resources are disclosed herein. A system may receive a request and parameterized rules from a database of parameterized rules for assessing potential vulnerability of user resources caused by a virtual resource transmission. The system may extract user vulnerability tolerance parameters indicative of user propensity for vulnerability and virtual resource vulnerability tolerance parameters indicative of vulnerability of the virtual resource. The system may input, into a parameterized rule, a user vulnerability tolerance parameter and a virtual resource vulnerability tolerance parameter to trigger execution of each parameterized rule. The system may then generate a match indicator indicating whether the virtual resource matches the user transmissions profile and, responsive to determining that the virtual resource does not match the user transmissions profile, trigger a temporary rejection on the transmission request requiring an override authorization.

20 Claims, 10 Drawing Sheets

```
user_transmissions_profile{
    user_id = "thisisjohndoe"
    user_level = 2
    linked_user = ("johndoesenior", 1)
    transaction_history{
        (txid = "3deiwue"; resource_id = "cryptocoin"; count = 33;
        timestamp = 21:23:35; date = 01:12:24)
        ...
        (txid = "dno3iur"; resource_id = "cryptocoin"; count = 50;
        timestamp = 01:29:58; date = 12:25:24)
    }
    risk_acceptance = "low"
    asset_type_risk_coin = "high"
    probability_of_default = 0.21
    behavioral_consistency_index = 0.9

}
```

310

```
transmission_request_0 {
    user_identifier:            "thisisjohndoe"
    virtual_resource_identifier: "cryptocoin"
    count:                      52
    tx_id:                      "en3jk23"
}
```

*FIG. 2A*

```
parameterized_rule_set {
    rule_ids: ["2enjdkjwsnw", "32krjndjs", "2o3ijrkld"]
}
rule_id_2enjdkjwsnw (beta, risk_acceptance){
    return ( 1 if (beta < 1 and risk_acceptance == "high") else 0)
}
...
```

*FIG. 2B*

```
user_transmissions_profile{
    user_id = "thisisjohndoe"
    user_level = 2
    linked_user = ("johndoesenior", 1)
    transaction_history{
        (txid = "3deiwue"; resource_id = "cryptocoin"; count = 33;
        timestamp = 21:23:35; date = 01:12:24)
        ...
        (txid = "dno3iur"; resource_id = "cryptocoin"; count = 50;
        timestamp = 01:29:58; date = 12:25:24)
    }
    risk_acceptance = "low"
    asset_type_risk_coin = "high"
    probability_of_default = 0.21
    behavioral_consistency_index = 0.9

IDENTIFYING MATCHING VIRTUAL RESOURCES

BACKGROUND

Virtual resources, such as digital content or virtual machines, are an integral part of computing systems that we rely on. Enabling transmission of such virtual resources in applications is crucial in allowing operation of systems such as medical and cloud systems. For example, in order to be able to help patients, sensitive medical data such as biometric data, Social Security number, insurance, etc., is often forwarded between systems. In another example, in order to test new software, a developer may require virtual machines in order to operate multiple operating systems on a single physical computer.

However, while such transfer of virtual resources is necessary in many applications, bad actors such as hackers may use such transfers and transmittals as weak points for exploitation. For example, a common problem arises where a bad actor exploits file upload features by embedding malicious code such as a script injection. While seemingly harmless, if the receiving application fails to properly validate or sanitize file types, the malicious file may be accepted and later used to take over the system or perform a data breach. Accordingly, it is vital to identify vulnerability for incoming virtual resources and detect potential issues before completing transmission of virtual resources.

SUMMARY

In some instances, to solve the problems above, entities may employ static thresholds or a plurality of tests that determine whether or not to allow a transmission to go through. Similarly, in order to account for differences between users, entities typically require users to answer extensive surveys regarding their risk appetite. However, these thresholds, tests, and surveys do not account for dynamic preferences of a user (e.g., entity, individual, etc.) that change over time, especially among different users. Furthermore, different virtual resources also often have varying indicia for vulnerability. For example, streaming media may include indicia of risk such as real-time risk potential, while cryptocurrencies may have indicia of risk such as irreversibility risk. They may also share indicia such as manipulation risk for injecting false or malicious content. Thus, the tests, thresholds, and surveys that entities employ do not account for different classifications of virtual resources and their unique characteristics. Designing individual tests specific to a user or virtual resource that are recent enough to be relevant is both time-consuming and resource intensive.

Accordingly, methods and systems are disclosed herein for assessing vulnerability of virtual resources. In particular, methods and systems disclosed herein enable assessment of vulnerability of virtual resources, e.g., vulnerability to pre-existing resources in the system, before completing the transmittal of the virtual resources. One mechanism for doing so may include identifying parameterized rules for assessing risk based on a virtual resource classification. By extracting parameters indicative of a user propensity for vulnerability from a user's profile, such a system can ensure that the user's preferences are temporally relevant and specific to a user. Responsive to a determination that the virtual resource is not a match (e.g., too risky or likely to place resources at risk), the system may temporarily reject the transmission and instead generate a request to a linked user, such as an operator, who may make a determination to permanently reject the transmission or enable the transmission.

For example, the system may receive a transmission request for acquiring a virtual resource by a user. Based on a virtual resource classification of the virtual resource, a set of parameterized rules can be accessed. By doing so, the system reduces resources needed for storage of the rules as they are stored in a manner to prevent duplication of rules among test suites. The system can extract parameters indicative of user propensity for vulnerability from a user profile and, based on the virtual resource classification, can extract parameters indicative of vulnerability of the virtual resource.

The system can input these parameters into the parameterized rules to determine whether the virtual resources match a transmissions profile for the user requesting the virtual resources, e.g., whether the virtual resources are safe enough for transmission according to the user's propensity for risk. Upon determining that the virtual resource does not match the user transmissions profile, e.g., the virtual resource is determined to be too risky for the user, the system may trigger a temporary rejection on the transmission request. The system may require an override authorization from a linked user that has owner access of the user transmissions profile in order to allow the transmission to go through.

After provisionally rejecting the transmission, the system may generate and transmit an authorization request to the linked user (e.g., operator or supervising entity). The authorization request can include data that may help the linked user make a final determination, such as the virtual resource classification, the user identifier, and parameter values. If the linked user approves, and the system receives an indication of approval from the linked user, the system can allow the transmission to go through and enable the user to acquire the virtual resource, e.g., by causing execution of one or more commands for completing the transmission request.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2A illustrates a data structure that represents a transmission request for acquiring a virtual resource by a user, in accordance with one or more embodiments of this disclosure.

FIG. 2B illustrates a data structure comprising an exemplary set of parameterized rules that may be used to assess potential vulnerability of user resources in accordance with one or more embodiments of this disclosure.

FIG. 3A illustrates an exemplary representation of a user transmissions profile, in accordance with one or more embodiments of this disclosure.

DETAILED DESCRIPTION

Figure 1:
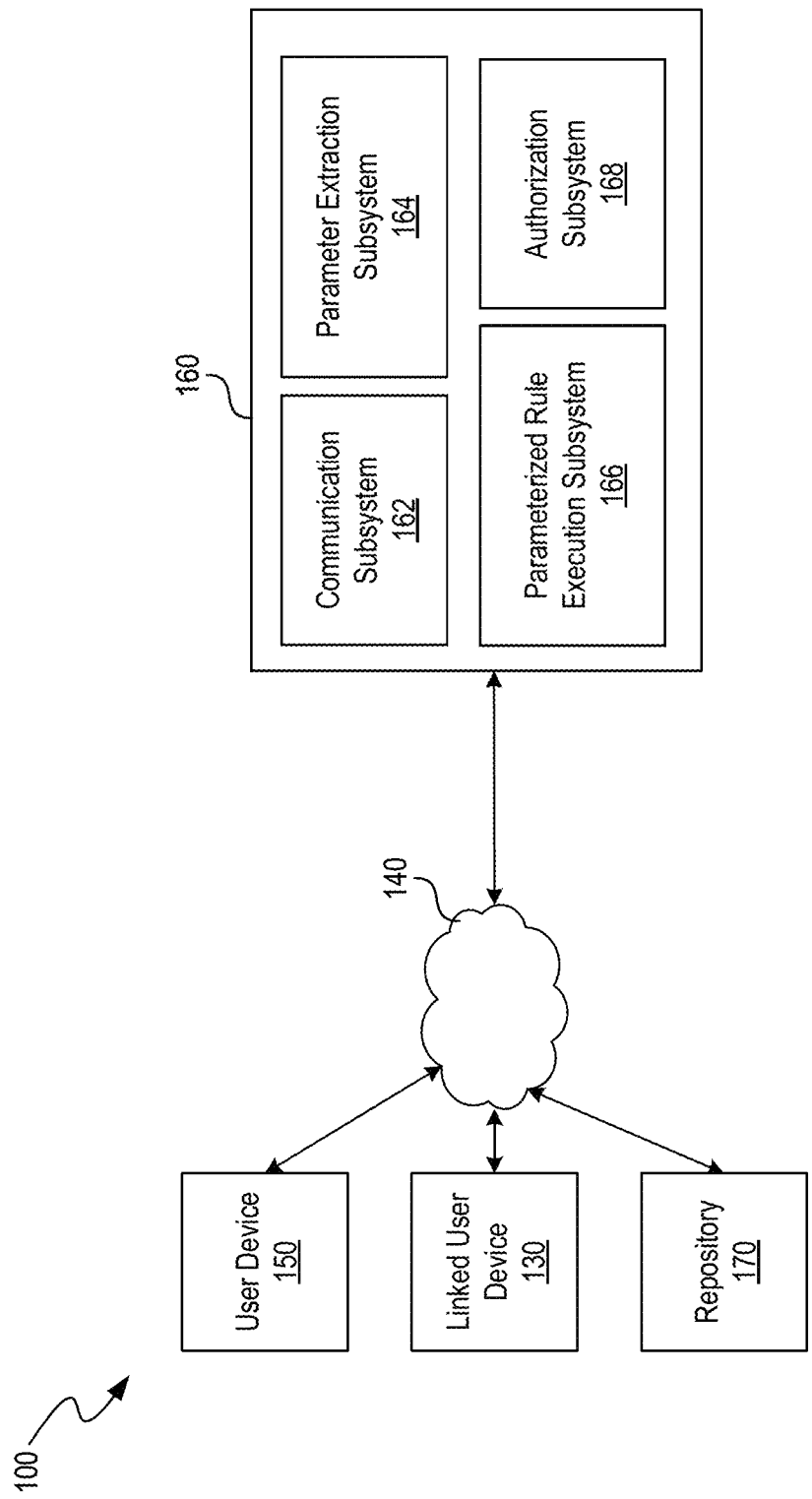
FIG. 1 shows an illustrative system for assessing vulnerability of virtual resources, such as by identifying virtual resources that match criteria relating to a user, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

As described herein, enabling transmission of virtual resources such as cryptocurrencies and stocks relating to cryptocurrencies is an important part of investment for individuals and entities at large. However, while such transfer of virtual resources is a necessary step for many individuals, transmitting or acquiring resources such as cryptocurrencies or stock can introduce risk to an overall portfolio and other assets of a user. In particular, these risks may introduce a weak point through which fraud can occur.

For example, investing on a cryptocurrency exchange can open users up to potential hacking through which the rest of a user's assets may also be compromised. While seemingly harmless, if the receiving application fails to properly detect or remove such risk, it may place users such as investors in a position where their portfolio has lost value or is at risk of losing value. In other applications, if the receiving application fails to properly identify and remove risk by validating or sanitizing file types, a malicious file may be accepted and later used to take over the system or perform a data breach.

While previous systems may employ static thresholding to determine whether or not to allow a transmission (e.g., acquisition of stocks or cryptocurrencies) to go through, such conventional techniques require users to answer extensive surveys regarding their risk appetite and ultimately do not account for dynamic preferences of a user. For example, in determining whether or not to acquire stock, users are often asked about their risk tolerance, risk capacity, and risk preference among other metrics collected. Furthermore, varying virtual resources also often have differing indicia for vulnerability or risk. For example, cryptocurrency may include indicia of risk such as potential for hacking for which a user may have a first tolerance, while stocks may have other indicia of risk such as beta values, for which a user may have a differing tolerance.

Systems described herein attempt to overcome such difficulties. Attempting to create a system/process to assess potential vulnerability that comes with transmission of virtual resources in view of the available conventional approaches created significant technological uncertainty. Creating such a system required addressing several unknowns in conventional approaches, such as time and space efficiency. In particular, where virtual assets include stocks or cryptocurrencies, the values of such assets can be highly volatile with time, and as such, time efficiency is an important part of a system that helps in transmitting them.

Conventional approaches rely on static thresholds for users and for different resources, which do not account for changes in user appetite in risk and vulnerability over time nor for dynamic rules among different types of resources. For example, a conventional system using static thresholds is often problematic. In particular, because different virtual resources often have varying indicia for vulnerability or risk, using static tests that encompass different assets can require processing of all indicia-many of which are not needed in every case. That is, only a few parameters may be important to consider for digital content, whereas only a few completely different parameters may be important to consider for cryptocurrency. Not only does this expend time to obtain real-time values for each of these indicia and parameters, it also expends time for processing all of these values. Conversely, the disclosed system seeks to identify a set of parameterized rules specific to the resource and user combination that is time efficient.

Additionally, conventional methods fail to account for user preferences changing over time. Previous methods to counteract such problems include continually requesting data from a user to account for changes. However, doing so created further technological uncertainty, since the legacy methods led to weak points during which users transmit their preferences. Recent "pump and dump" schemes may lead to developers generating misleading information to create a buying frenzy that will "pump" up the price of a stock and then "dump" shares of the stock by selling their own shares at the inflated price. Requesting data regarding user preferences for risk continually creates risk for bad actors to insert false data indicative of a user's high preference for risk, where in reality the user may not have high affinity for risk.

To overcome the technological uncertainties, the inventors systematically evaluated multiple design alternatives. For example, the inventors considered different groupings of transmissions that would ensure fewer weak points for potential bad actors to take advantage. The use of machine learning to determine whether the system matched the user proved to be inefficient as it failed to encompass the width and breadth of specific parameters that needed to be considered for a wide variety of assets while remaining efficient. Having parameterized rules proved to be less time- and resource intensive, as specific parameterized rules corresponding to an asset type was more effective than having hundreds of machine learning models that needed to be trained and executed for each of the asset types or having a large machine learning model encompassing all cases which would require processing of hundreds of irrelevant parameters for each transaction. Not only was space saved for memory but for storage, additionally.

Thus, the inventors experimented with different methods for assessing vulnerability while minimizing information transmission between devices of the user and the system and while maximizing time-based and memory-based efficiency. For example, the inventors considered, as described herein, pros and cons to different approaches such as machine learning models and different structures of rule storage (e.g., as described herein to remove duplicates) to identify the most efficient and effective approaches. Additionally, the inventors systematically evaluated different strategies for when to trigger calculations, as calculating certain values ahead of time may be unnecessary and may require storage that is unavailable or can be used for other purposes. The inventors evaluated, for example, different methods of extraction, transmission, and calculations as described.

In particular, according to some embodiments described herein, a system may receive a request for a transaction initiated from a system (e.g., Tradelink System) where specific products are onboarded and supported (e.g. equities, fixed incomes, alternate investments, mutual funds etc.) Based on the request, the system may extract user account data such as demographic details, or risk tolerance and extract product data based on the request. The system may be configured with predefined rules for each onboarded products and product specific rules can be invoked and executed once the request is received. The values may be used to execute the parameterized rules, through which the system can determine a risk factor. Responsive to determining that the risk factor rule evaluation satisfies the conditions for passing, the rule may pass else the rule may satisfy the fail condition and may fail. Based on the category of the rule as either a hard failure or soft failure, the transfer may be prevented from executing or it may only be temporarily prevented from executing (in the case of a soft failure). The user may have the capability to override the soft failure by providing a reasoning. Another person, such as an operator or banker, may submit the trade and can override the rule upon which the trade may be executed and proceed to settlement.

Environment 100 of FIG. 1 shows an illustrative system for assessing vulnerability of virtual resources, in accordance with one or more embodiments of this disclosure. In particular, environment 100 may be used to assess the vulnerability of a transfer (e.g., to obtain new assets or release held assets) causes existing assets linked to a user. For example, where a user owns, has access to, or is otherwise a custodian of a portfolio of assets and desires to obtain more assets or transfer assets from their portfolio outwards, environment 100 may be used to detect potential risk and, furthermore, may be used to determine whether or not to proceed with the transfer based on determined risk. In one embodiment, the system may receive a request for a transaction initiated from a digital platform or network that facilitates the exchange of trade information and documents between businesses involved in international trade (e.g., Tradelink System) where specific products are onboarded and supported (e.g., equities, fixed incomes, alternate investments, mutual funds etc.

In particular, the system can obtain values for parameters, such as those indicative of the user's propensity for vulnerability and for the asset being transferred. These parameters may be input into parameterized rules specific to the asset type and the outputs of the parameterized rules may be used to determine whether the transfer matches the user's risk tolerances and other parameters. In one embodiment, based on the request the system may extract user account data such as demographic details and product data (e.g., risk rating, knowledge details and tenor) based on the request. The techniques described herein enable dynamic rules to be applied based on the assets being transferred. Rather than conventional techniques that employ static rules, such a technique allows for more precise comparisons and matching to be performed.

For example, environment 100 may include a vulnerability assessment system 160 able to assess vulnerability. Vulnerability assessment system 160 may include software, hardware, or a combination of the two. For example, vulnerability assessment system 160 may be a physical server or a virtual server that is running on a physical computer system. In some embodiments, vulnerability assessment system 160 may be configured on a user device (e.g., a laptop computer, a smartphone, a desktop computer, an electronic tablet, or another suitable user device) and configured to execute instructions for assessing vulnerability. In particular, vulnerability assessment system 160 may include several subsystems, each configured to perform one or more steps of the methods described herein, such as communication subsystem 162, parameter extraction subsystem 164, parameterized rule execution subsystem 166, and authorization subsystem 168.

As described herein, the vulnerability assessment system 160 may obtain a transmission request for acquiring a virtual resource by a user. A user, such as at user device 150, may desire to acquire a virtual resource, also referred to herein as a digital asset. As referred to herein, a virtual resource or digital asset may include any non-physical, intangible entity that holds value and may be owned, controlled, and/or transferred. According to some embodiments, these assets may represent financial value, access rights, digital content, and/or the like. For example, virtual resources may include cryptocurrencies, tokens, digital content, cloud computing resources, digital contracts and agreements, and/or the like. The request may be automatically generated at the user device when the user tries to transfer assets as an intermediary process, or may be manually generated, e.g., by the user or operator.

FIG. 2A illustrates a data structure 200 that represents a transmission request for acquiring a virtual resource by a user. The transmission request may include data such as the user identifier linked to the user device or user. The user identifier may be any unique alphanumeric value that can be used to uniquely identify the user. In the example of data structure 200, the user identifier is "thisisjohndoe" and includes a username that further enables access by the user to the user's resources. Data structure 200 may further include a virtual resource identifier "virtual resource identifier" which identifies the type or name of the virtual resource requested for transfer. Transfer in this context may refer to acquiring the resource or alternatively transmitting the resource, e.g., to another user. In the example of FIG. 2B, the virtual resource identifier identifies the asset as being "cryptocoin." The data structure 200 further includes a count which indicates the number of resources requested for transfer. Data structure 200 may further include transaction identifier "tx_id" which may include a unique alphanumeric value used to reference the transaction at a later time. For example, the transfer may be recorded and stored as part of a user's profile and used to determine values and trends relating to the user's propensity for risk.

As described, the vulnerability assessment system 160 may receive the transmission request from user device 150 via communication network 140 at communication subsystem 162 of the vulnerability assessment system 160. Communication network 140 may be a local area network (LAN), a wide area network (WAN; e.g., the internet), or a combination of the two. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as parameter extraction subsystem 164, parameterized rule execution subsystem 166, and authorization subsystem 168.

According to some embodiments, responsive to receiving the request, the vulnerability assessment system 160 may obtain parameterized rules specific to the asset, e.g., virtual resource classification or group. For example, parameterized rules for various types of assets may be stored locally on the system itself or may be accessible via communication network 140 and stored remotely on a repository 170. According to some examples, the rules may be stored partially on repositories associated with the platforms. The assets may be acquired or otherwise transferred. For example, rules for "cryptocoin" may be stored on a platform for "cryptocoin." Responsive to identifying the asset requested for transmission is of a specific classification or grouping (e.g., "cryptocoin," "coin"), the vulnerability assessment system 160 may request related parameterized rules in a variety of ways.

According to some embodiments, the vulnerability assessment system 160 may identify the virtual resource classification based on the virtual resource identifier of the transmission request. In some examples, the virtual resource classification may be a class of the virtual resources to which the virtual resource identified by the virtual resource belongs. Vulnerability assessment system 160 may generate a request for identifying rules at the database of the parameterized rules, such as by inserting search tags specific to the virtual resource classification. The vulnerability assessment system 160 may then transmit the request for rules to the database, e.g., such as via communication subsystem 162.

In some embodiments, in order to conserve storage space and prevent duplicate results and duplicate execution of rules, the repository 170 may be configured to store just one copy of each rule such that storage of each rule is unique, that is, where a first virtual resource has a set of parameterized rules and a second virtual resource has a second set of parameterized rules overlapping with the first (i.e., some rules are identical between the two sets). The vulnerability assessment system 160 may only store the rule once and the rules relating to more than one resource may be tagged with all virtual resources they are meant to test. For example, a rule may be tagged with metadata indicating that it should be used to test vulnerability for resource type "cryptocoin" and "cryptostocks." Responsive to a request for identifying rules for a specific resource type, the repository may identify each rule tagged with metadata for the specific resource type and transmit them to vulnerability assessment system 160. Alternatively or additionally, for each resource type, there may be a list of rule identifiers for rules that should be executed. The repository may be further equipped to provide the rules themselves to the vulnerability assessment system 160 via communication subsystem 162.

As described, the vulnerability assessment system 160 may receive, based on a virtual resource classification of the virtual resource, a set of parameterized rules from a database of parameterized rules for assessing potential vulnerability of user resources caused by a virtual resource transmission. For example, risk tolerance based rules may include RDIP rules which covers simulated WAARR, and concentration checks. In some examples, each parameterized rule includes one or more fields for entering one or more parameters. As one example, FIG. 2B illustrates a data structure comprising an exemplary set of parameterized rules that may be used to assess potential vulnerability of user resources. Alternatively or additionally, rather than retrieving the rules, the system may be configured with predefined rules for each onboarded product (e.g., asset) and the product-specific rules may be invoked and executed once the request is received.

Furthermore, the rules may also include parameterized rules that relate to vulnerability of being in violation of regulations, guidelines, and rules set by various entities (e.g., the asset platform, government, etc.). For example, the rules may be configured to check whether the transfer is in alignment with various global and local regulations, an allowed transaction/notional amount etc.

FIG. 2B illustrates the parameterized rule set 250 for the identified classification of the virtual resource, "cryptocoin." The parameterized rule set 250 includes a listing of the parameterized rules. For example, parameterized rule set 250 includes list "["2enjdkjwsnw"; "32krjndjs"; "2o3ijrkld"]" which includes unique alphanumeric values uniquely identifying each rule. The rule set also contains definitions (e.g., function definitions) for each parameterized rule. FIG. 2B illustrates, for example, definition for "rule_id_2enjdkjwsnw" which takes in as inputs a beta value and risk acceptance value. As an output, the parameterized values may output that the virtual resource matches a user profile, e.g., is in accordance with a user's propensity for risk.

In order to execute the parameterized rule set 250 obtained via communication subsystem 162, vulnerability assessment system 160 may extract parameters to input into the parameterized rules. In particular, communication subsystem 162 may pass the parameterized rule set 250 to parameter extraction subsystem 164 or a pointer to the data in memory. The parameter extraction subsystem 164 may extract two kinds of parameters. For example, parameter extraction subsystem 164 may extract user vulnerability tolerance parameters indicative of user propensity for vulnerability.

According to some embodiments, user vulnerability tolerance parameters may be extracted from a user transmissions profile identified using the user identifier. A user transmissions profile may store data regarding the user's past transactions such as past attempts to transact and their outcome (e.g., whether a resource was allowed and ultimately transmitted), as well as values indicative of transmission history, such as average value of transmissions, frequency of large transmissions, percentage of high-risk transactions, behavioral consistency, risk acceptance, etc. In some examples, the profiles may be stored locally or remotely, e.g., such as on repository 170. In some cases, profiles may be dynamically stored based on frequency of transmissions requests a user makes. For example, profiles for users who more frequently make transmissions requests may be stored locally while those who do so less frequently may be stored remotely in order to save on local storage space while maximizing efficiency. According to some examples, the risk tolerance of the user may include an investor rating that the system creates for the client at the time of onboarding and may be part of user account data which may also include other data such as demographic details like domicile country, and other data such as LV code, etc.

For example, FIG. 3A illustrates an exemplary representation of a user transmissions profile 310, in accordance with one or more embodiments of this disclosure. The user transmissions profile for a specific user can be identified through the "user_id" field which includes a unique identifier to identify the user. As described herein, the user's transmissions profile may include previous transactions. In the example of FIG. 3A, the user "thisisjohndoe" has previous transmissions with identifiers "3deiwue" and "dno3iur." The profile indicates the type of resource transmitted, the timestamp, date, and count for how many of the resources were transmitted. Furthermore, the user profile lists values for user vulnerability tolerance parameters such as risk acceptance, probability of default, behavioral consistency index, and in some cases, the parameters are granular and asset type dependent. In the example of FIG. 3A, the user vulnerability tolerance parameters include "asset_type_risk_coin," which is indicative of risk that a user is tolerant of, specific to coin-type assets.

Responsive to receiving the transmission request, the vulnerability assessment system 160 may obtain the user identifier from the request as well as the parameters needed from the user identifier. For example, the parameterized rule set 250 of FIG. 2B requires two parameters, "beta" and "risk_acceptance," and risk acceptance is a user vulnerability tolerance parameter. In order to extract the risk acceptance parameter from the user transmissions profile, the vulnerability assessment system 160 may generate and transmit a query to local and/or remote storage using the user identifier (e.g., "thisisjohndoe") and the parameter name "risk_acceptance" to obtain the parameter value.

Figure 7:
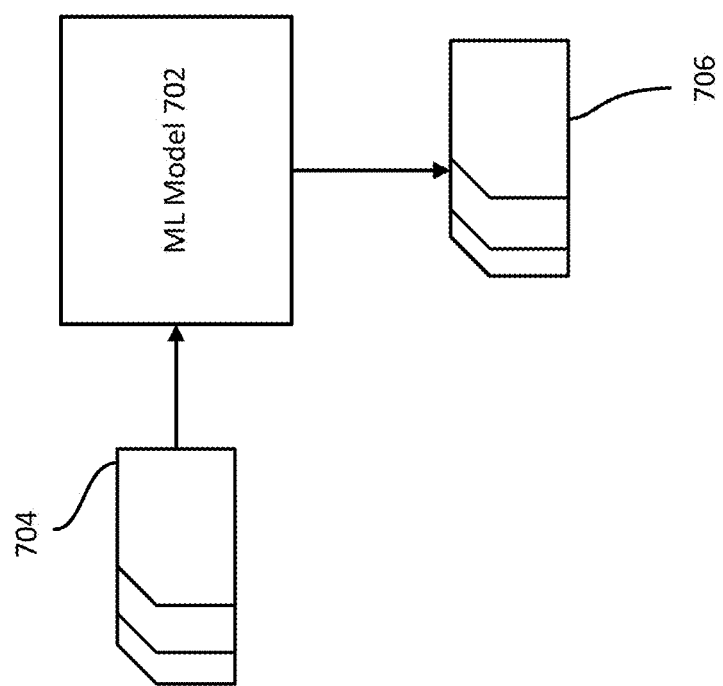
FIG. 7 illustrates an exemplary machine learning model that can be used to assess vulnerability of virtual resources, in accordance with one or more embodiments of this disclosure.
Figure 8:
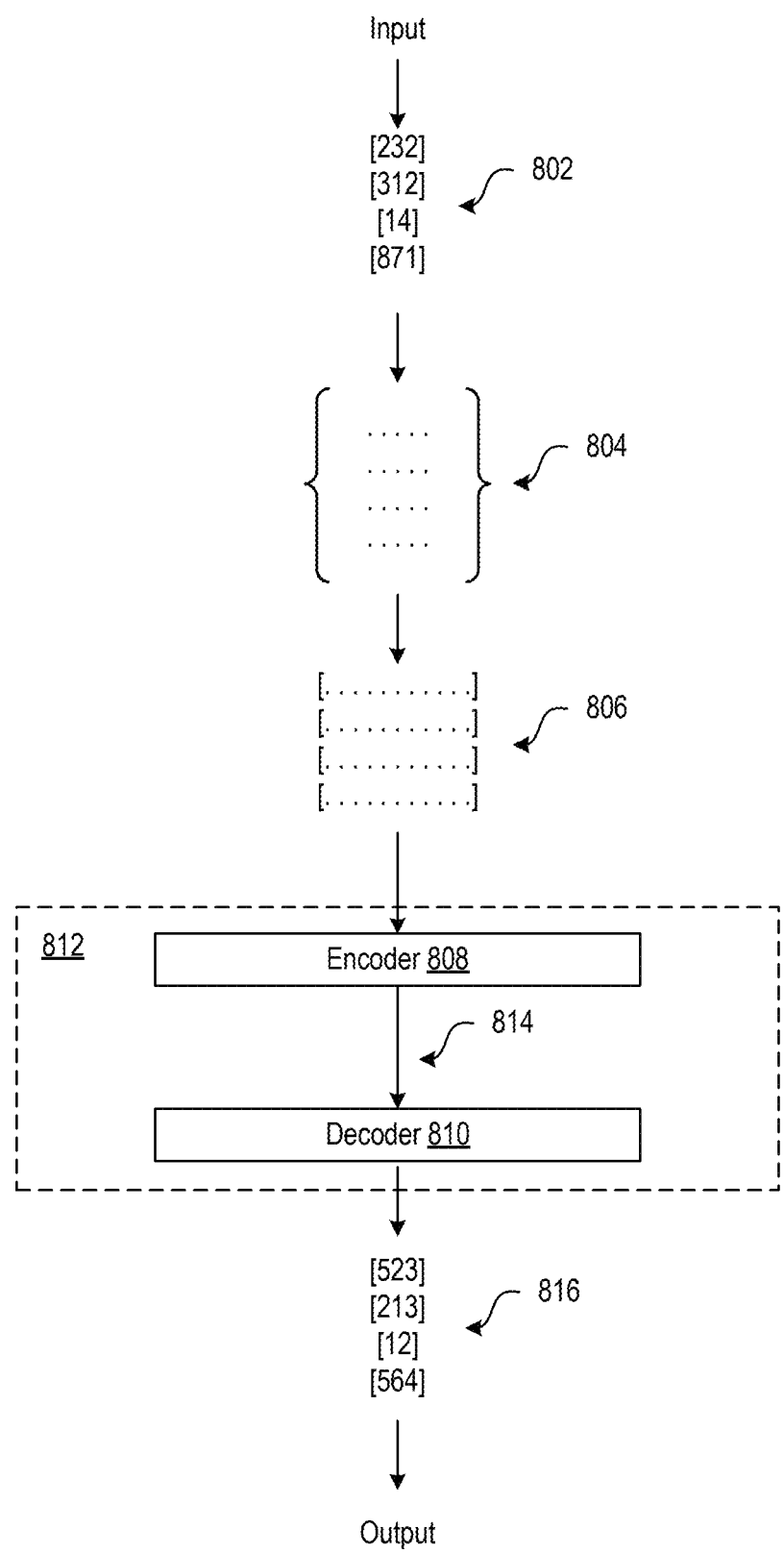
FIG. 8 is a block diagram of an example transformer that can be used for assessing vulnerability of virtual resources, in accordance with one or more embodiments of this disclosure.

As described further in connection with FIG. 7-8, in some cases, a user vulnerability tolerance parameter may be missing or return null when local and/or remote repositories are queried. In this case, the vulnerability assessment system 160 may impute the values, e.g., using machine learning. For example, responsive to determining that a user vulnerability tolerance parameter corresponding to a parameterized rule cannot be extracted, the vulnerability assessment system 160 may generate a vector using other known user vulnerability tolerance parameters and input the vector into a machine learning model to obtain an imputed value for the user vulnerability tolerance parameter. Vulnerability assessment system 160 may further insert the imputed value to the user transmissions profile with metadata indicating that the imputed value is imputed.

Parameter extraction subsystem 164 may further extract virtual resource vulnerability tolerance parameters indicative of vulnerability of the virtual resource. For example, parameter extraction subsystem 164 may identify, based on the virtual resource classification, a grouping or type of virtual resource. For example, responsive to receiving the transmission request, the vulnerability assessment system 160 may obtain the virtual resource classification (e.g., "cryptocoin"). The vulnerability assessment system 160 may also identify the virtual resource vulnerability tolerance parameters needed. For example, the parameterized rule set 250 of FIG. 2B requires two parameters, "beta" and "risk_ acceptance," and beta is a virtual resource vulnerability tolerance parameter. In order to extract the beta parameter to use downstream during execution of the parameterized rule, the vulnerability assessment system 160 may generate and transmit a query to local and/or remote storage using the virtual resource identifier (e.g., "cryptocoin") and the parameter name "beta" to obtain the parameter value.

Figure 3B:
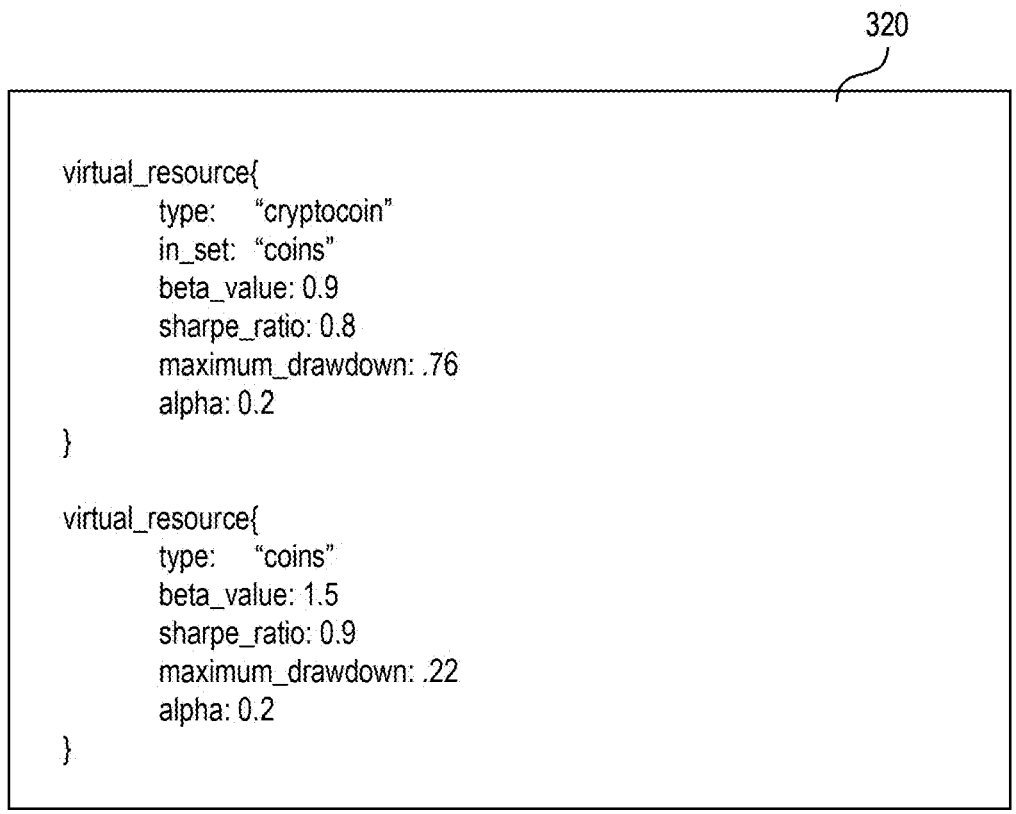
FIG. 3B illustrates an exemplary representation of virtual resource vulnerability tolerance parameters for a virtual resource, in accordance with one or more embodiments of this disclosure.

As an example, FIG. 3B illustrates an exemplary representation of a data structures 320 storing virtual resource vulnerability tolerance parameters for a virtual resource. Data structures 320 may be stored remotely, such as on repository 170, or stored locally. In some examples, such data structures may be stored on a combination of remote and local storage. For example, most frequently transmitted types of resources may have corresponding data structures stored locally while data structures corresponding to resources that are infrequently transmitted (e.g., using least frequently used (LFU) cache, dynamic priority queue) are stored remotely and accessed via communication subsystem 162.

In the example of FIG. 3B, the first "virtual_resource" data structure includes data for resource type "cryptocoin." The first data structure includes values for "beta_value," "sharpe_ratio," "maximum_drawdown," and "alpha." According to some embodiments, the virtual resource may be an asset such as stocks or cryptocurrency or coins where a relative value is dynamic (e.g., stock prices vary over time). In some examples, the virtual resource parameters may be updated in real time, or nearly in real time. Alternatively or additionally, to conserve on computational and storage resources, the parameters may be updated dynamically, such that volatile assets are updated more frequently than stable assets. As can be seen in the first data structure for "cryptocoin," although "cryptocoin" is a resource type, it also belongs to the set of resource type "coin." According to some embodiments, resources may be grouped into various sets and the parameters of the sets may be used to supplement the parameter for the resource type (e.g., where the resource type lacks much data).

In some examples, the parameter extraction subsystem 164 may not be able to extract certain user vulnerability tolerance parameters because they must be calculated as a function of other parameters or other values in the user transmissions profile. Doing so may also be less resource intensive because rather than pre-calculating these values and storing them, they are calculated on a need basis. In some examples, the vulnerability assessment system 160 may access records for previous transmissions initiated by the user. As described herein, each record may include the virtual resource classification corresponding to a transmitted virtual resource and a timestamp indicating a time at which a previous transmission was initiated but may also further include the virtual resource vulnerability tolerance parameters for the transmitted virtual resource. The vulnerability assessment system 160 may calculate values for the user vulnerability tolerance parameters as a function of corresponding virtual resource vulnerability tolerance parameters from the previous transmissions, wherein the values for the corresponding virtual resource vulnerability tolerance parameters are weighed according to temporal proximity of the timestamp to a current time.

Once the parameter extraction subsystem 164 extracts the user vulnerability tolerance parameters and virtual resource vulnerability tolerance parameters, parameter extraction subsystem 164 may pass the parameters to the parameterized rule execution subsystem 166 or pass pointers to the data in memory to parameterized rule execution subsystem 166. The parameterized rule execution subsystem 166 may input, into each parameterized rule, a corresponding user vulnerability tolerance parameter and a corresponding virtual resource vulnerability tolerance parameter to trigger execution of each parameterized rule. As described herein, each parameterized rule is used to determine whether the virtual resources match a transmissions profile for the user requesting the virtual resources.

Figure 4:
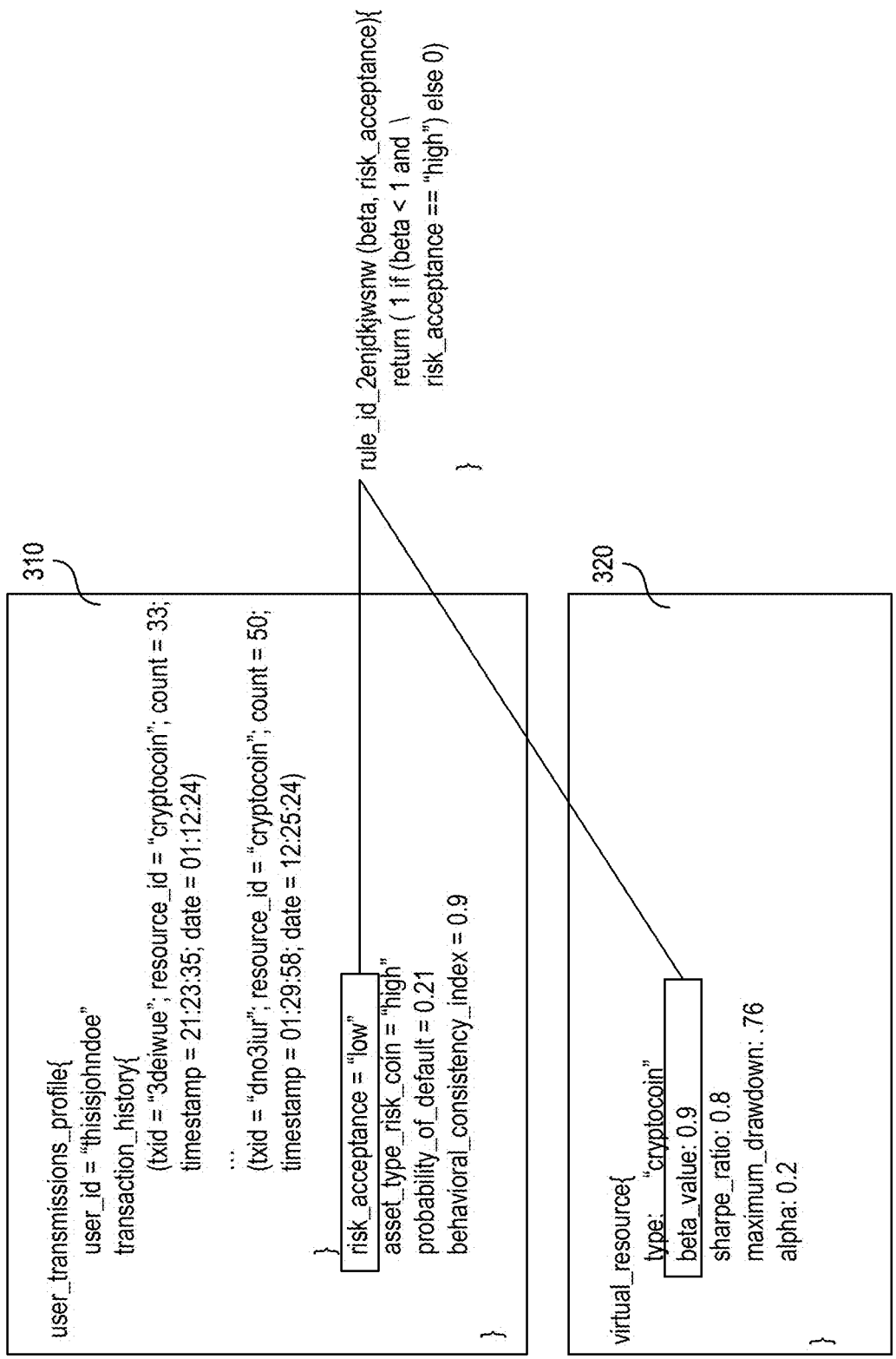
FIG. 4 illustrates extraction of parameters from a user transmissions profile and parameters relating to the resource, in accordance with one or more embodiments of this disclosure.

FIG. 4 illustrates a representation for using extracted parameters from a user transmissions profile and parameters relating to the resource as inputs to a parameterized rule. In the example of FIG. 4, the user transmissions profile 310 and data structures 320 are shown alongside a parameterized rule. As described in relation with FIG. 2B, the parameterized rule is specific to the type of resource, e.g., "cryptocoin." The parameterized rule is triggered when inputs beta and risk acceptance are input into the rule. In order to extract the parameters, the vulnerability assessment system 160, as described herein, may generate search queries which may be used to obtain the parameters e.g., either locally or from remote storage. The rule is programmed to return 1 if two criteria are met "beta<1 and risk_acceptance=='high'" and return 0 if the criteria are not met. In the example of FIG. 3A-B, the user has "low" risk acceptance meaning that one of the criteria of having "high" risk acceptance is not met. Thus the single parameterized rule returns a 0, indicating that for this criteria there is no match, e.g., indicating that the stock is not within the user's propensity for risk (e.g., too risky) in this specific dimension.

According to some embodiments, some assets may only be safely or legally transmissible to and/or from designated jurisdictions. For example, at least one parameterized rule of the set of parameterized rules may include a regional designation indicative of jurisdictions in which the virtual resource cannot be transmitted. In such cases, the vulnerability assessment system 160 may extract, from the user transmissions profile, a primary user location and may also extract, from the transmission request, metadata indicative of a current user location and a length of a user session on the user device. The parameterized rule execution subsystem 166 may then input, into the parameterized rule, the primary user location and the metadata to determine whether or not the virtual resource can be transmitted. In some embodiments, if the parameterized rule execution subsystem 166 determined, based on the output of the rule, that the virtual resource cannot be transmitted, parameterized rule execution subsystem 166 may cause execution of remaining parameterized rules of the set of parameterized rules to end and transmit a message of failed transmission to the user device via communication subsystem 162.

As described herein, the parameterized rule execution subsystem 166 may generate, based on the execution of each parameterized rule, a match indicator indicating whether the virtual resource matches the user transmissions profile. Parameterized rule execution subsystem 166 may pass this match indicator or a pointer to the data in memory to authorization subsystem 168. In particular, as shown in FIG. 2B, the set of parameterized rules may each return a 0 or 1, indicating whether there was a match or no match for the specific criteria tested. That is, the system may obtain, based on executing each parameterized rule, a value for a binary variable (e.g., 0 or 1, "no match" or "match") configured to be set to a first value if a virtual resource vulnerability tolerance parameter exceeds the corresponding user vulnerability tolerance parameter and a second value if a user vulnerability tolerance parameter exceeds the corresponding virtual resource vulnerability tolerance parameter. Further, a data structure comprising values for binary variables corresponding to the set of parameterized rules may be generated. Based on determining that an added value of the binary variables exceeds a predetermined threshold, the system may detect a match and the match indicator may be set to reflect such.

Where the match indicator indicates that transmission of the virtual resource matches the user transmission profile, the authorization subsystem 168 may cause execution of one or more commands for completing the transmission request. In some examples, the vulnerability assessment system 160 may receive a notification of successful execution of the one or more commands and further update the user vulnerability tolerance parameters and the user transmissions profile to include details of the transmission. According to some examples, the commands for completing the transmission request may include automatically signing a transaction using a cryptographic signature, transmitting commands via the communication subsystem 162, and/or the like. The commands for completing the transmission request may be different for each resource type or resource set, and in some embodiments, the vulnerability assessment system 160 may retrieve instructions from data structures (e.g., data structures 320) on an address or device to which to send commands for completing the transaction.

Alternatively, responsive to determining that the virtual resource does not match the user transmissions profile, the authorization subsystem 168 may trigger a temporary rejection on the transmission request requiring an override authorization from a linked user, wherein the linked user has owner access of the user transmissions profile. Referring to FIG. 3A, user transmissions profile 310 may include, in addition to the user identifier, an identifier of a linked user. In the example of FIG. 3A, the linked user is identified by a tuple including the user identifier "johndoesenior" and a level indicating their hierarchy. In this case "johndoesenior" is of level 1 whereas "thisisjohndoe" has level 2. This would indicate that "johndoesenior" is of a higher level and so may have authority to authorize requests or override other actions performed by "thisisjohndoe" and other linked users who are lower in the hierarchy.

The authorization subsystem 168 may generate and transmit an authorization request to the linked user, e.g., to linked user device 130. The authorization request may include the virtual resource classification, the user identifier, and at least one user vulnerability tolerance parameter. For example, the authorization request may show the criteria that failed and the relevant parameters. In response to receiving an indication of approval from the linked user (e.g., via linked user device 130), the authorization subsystem 168 may cause execution of one or more commands for completing the transmission request. The vulnerability assessment system 160 may receive a notification of successful execution of the one or more commands and may update the user vulnerability tolerance parameters of the user transmissions profile responsive to the notification by recalculating the user vulnerability tolerance parameters based on values of the virtual resource vulnerability tolerance parameters.

According to some embodiments, depending on the type of parameterized rules failed, the subsequent actions may be different. For example, the rules may be grouped into two different groups such as a hard failure and soft failure. If the failed rules include at least one rule that are grouped or categorized as a hard failure, then the transmission may be permanently blocked, not temporarily. In some examples, the user may further be notified. If the failed rules are all soft failure rules then the requesting user or linked user has the capability to override the rule, such as by providing the system with a reasoning. In some embodiments, the linked user may be an operator, such as bankers at the system, who submit the trade and can override the rule. When the override is received the system may execute the transfer (e.g., trade) and the transfer may then proceed for settlement.

According to some embodiments, the system may request or require that entities to review the parameterized rules to ensure their accuracy. For example, the system may group the rules specific to an entity (e.g., company, agency, etc.)

and transmit the rules via communication subsystem 162. The entity may then modify or confirm the accuracy of the rules. For example, the communication subsystem 162 may parse the response to identify modifications and apply the modifications accordingly. The system may then put the modified rules into effect and replace the old rules, e.g., in the repositories. The system may generate this request periodically, such as annually. The period may be set by the entities themselves, or by an operator at the system.

Figure 5:
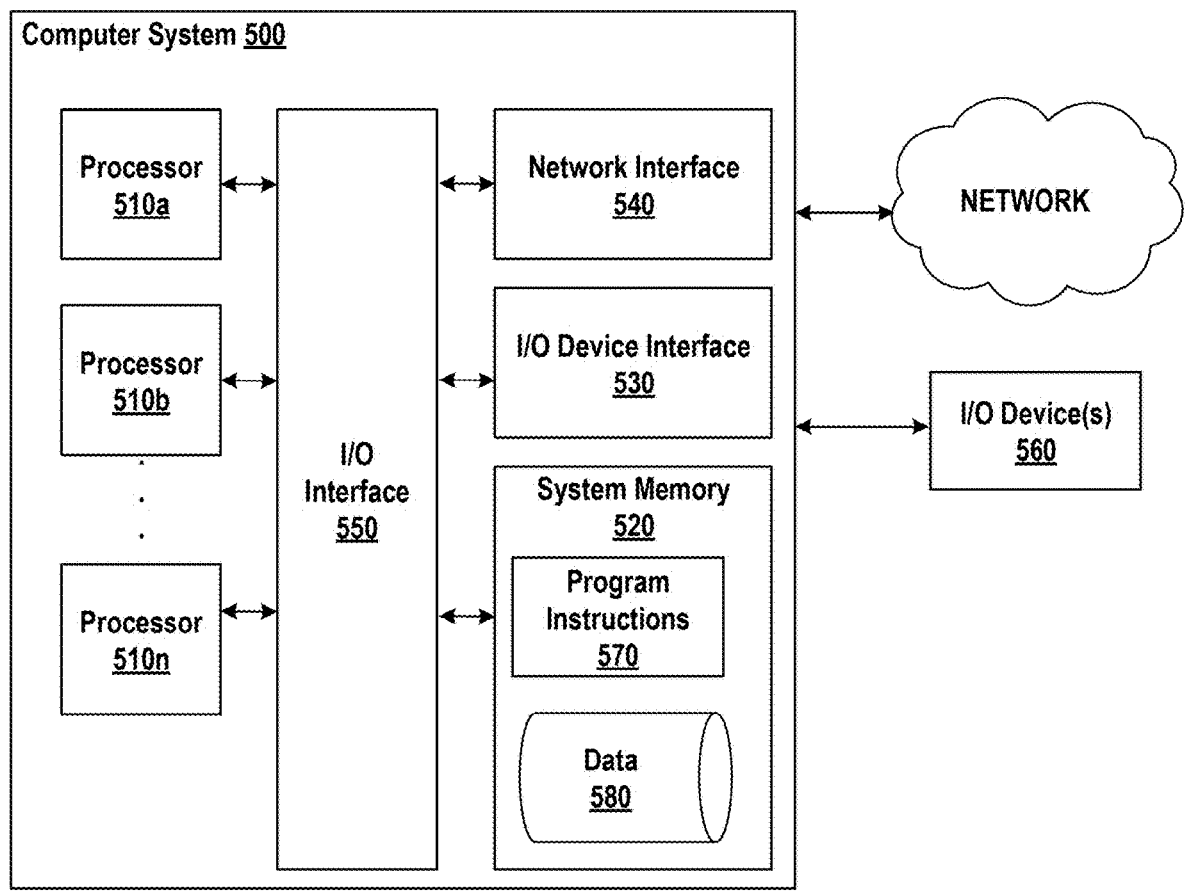
FIG. 5 illustrates a computing system that can be used for assessing vulnerability of virtual resources, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., processor 510a), or a multiprocessor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

The I/O device interface 530 and I/O devices 560 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a LAN, a WAN, a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 6:
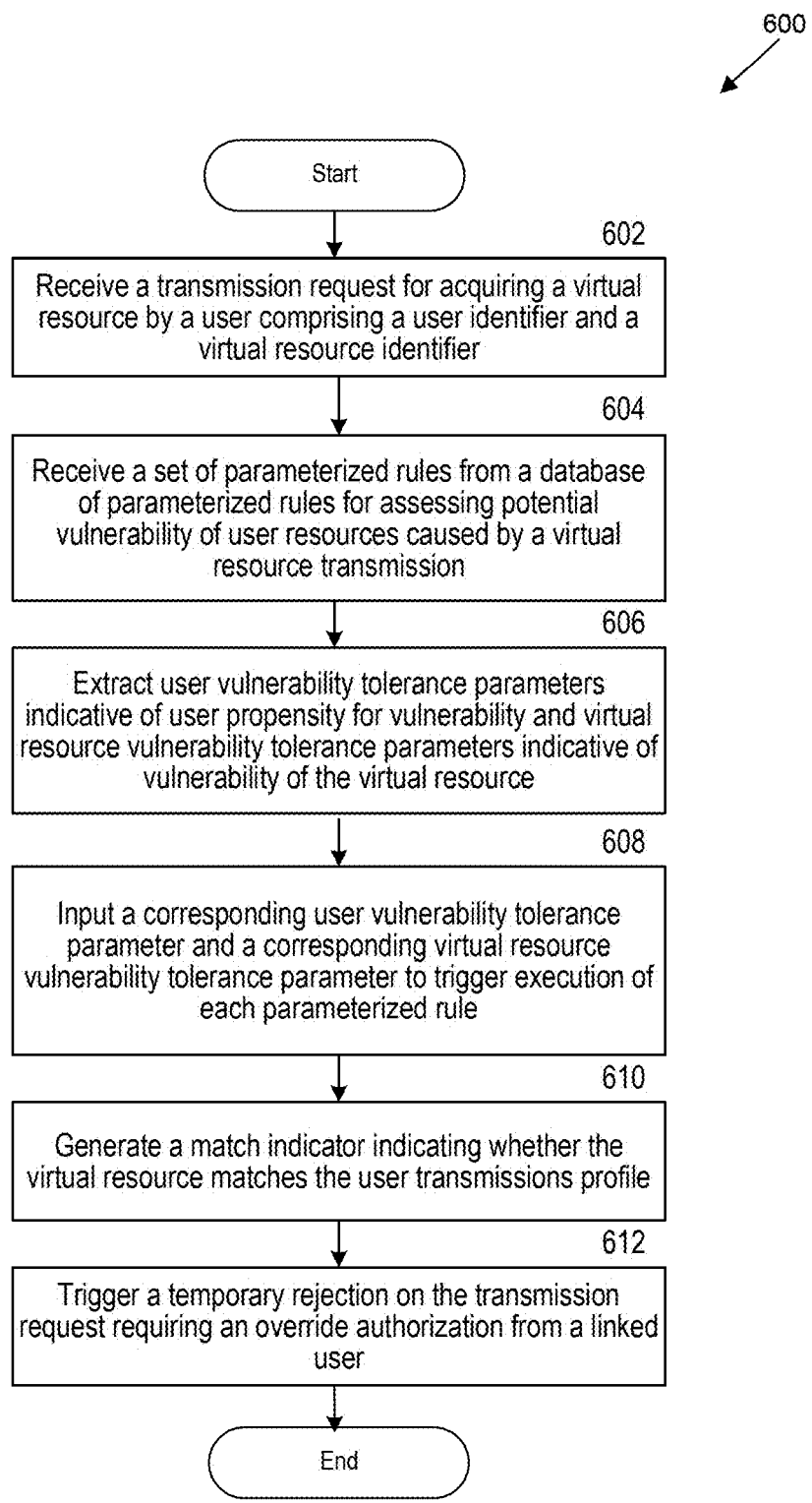
FIG. 6 is a flowchart of operations for assessing vulnerability of virtual resources, in accordance with one or more embodiments of this disclosure.

FIG. 6 is a flowchart 600 of operations for assessing vulnerability of virtual resources, such as in a network system, in accordance with one or more embodiments of this disclosure. The operations of FIG. 6 may use components described in relation to FIG. 5. In some embodiments, vulnerability assessment system 160 may include one or more components of computer system 500.

At operation 602, one or more of processors 510a-510n receive a transmission request for acquiring a virtual resource by a user comprising a user identifier and a virtual resource identifier. One or more of processors 510a-510n may receive the request over communication network 140 using network interface 540.

At operation 604, one or more of processors 510a-510n may further receive a set of parameterized rules from a database of parameterized rules for assessing potential vulnerability of user resources caused by a virtual resource transmission. According to some examples, as described herein, the parameterized rules may include one or more fields for entering one or more parameters and be used to determine whether the virtual resources match a transmissions profile for the user requesting the virtual resources. One or more of processors 510a-510n may receive the rules over communication network 140 using network interface 540.

At operation 606, one or more of processors 510a-510n extracts user vulnerability tolerance parameters indicative of user propensity for vulnerability and virtual resource vulnerability tolerance parameters indicative of vulnerability of the virtual resource. For example, user vulnerability tolerance parameters may be extracted from a user transmissions profile identified using the user identifier, and virtual resource vulnerability tolerance parameters may be extracted based on the virtual resource classification.

At operation 608, one or more of processors 510a-510n may input a corresponding user vulnerability tolerance parameter and a corresponding virtual resource vulnerability tolerance parameter to trigger execution of each parameterized rule.

At operation 610, one or more of processors 510a-510n generates a match indicator indicating whether the virtual resource matches the user transmissions profile, e.g., such as based on the execution of each parameterized rule. At operation 612, one or more of processors 510a-510n may trigger a temporary rejection on the transmission request requiring an override authorization from a linked user. For example, the system may trigger the rejection responsive to determining that the virtual resource does not match the user transmissions profile. In some embodiments, the linked user has owner access of the user transmissions profile.

FIG. 7 illustrates an exemplary machine learning model 702, which may be used to impute values during the extraction process as described herein. According to some examples, the machine learning model may be any model, such as a model for data imputation. For example, the machine learning model may be trained to intake input 704, including input data received. As a result of inputting the input 704 into the machine learning model, the model may then output an output 706, which may include, for example, an imputed value for a missing, or not yet obtained, user vulnerability tolerance parameter. As described herein, the input data can include data relating to the user's propensity for risk or resource vulnerability. The input data may include values from the user transmission profile, such as any combination of previous transfers successfully made, previous transfers failed, previous transfers attempted, and/or other user vulnerability tolerance parameter.

The output 706 may include value of the missing user vulnerability tolerance parameter, such as a numeric value or string indicating a level for the user vulnerability tolerance parameter (e.g., "high risk," "47," etc.). Furthermore, as described, the machine learning model may be configured to output a confidence interval or other metric for certainty regarding the outputs. The machine learning model may have been trained on a training dataset containing a plurality of user transmissions profile, not just limited to the specific user for which the resource assessment is taking place. Alternatively, or additionally, a model may be specifically implemented or trained on the specific user. An exemplary machine learning model is described in relation to FIG. 7 herein.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Such a technique may be used to identify values from webpages related to data on webpages for virtual resources and generate a corpus that can be accessed to impute values. For example, in some embodiments, if a value is missing, the model may access the corpus to identify relevant information for the missing value. For example, the values can be used to calculate the missing value. If the corpus indicates that text from news articles shows a cryptocurrency to be "risky" and "volatile" the system may impute a missing "risk" parameter to be "high." Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language, e.g., for alerts to operators, or commands that have been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In the example provided herein, a prompt may be generated for the LLM to impute a missing value. For example, the prompt may ask "Given a user whose risk appetite is high and whose age is 24 and whose location is in Michigan, what would his transaction volatility likely be?" and may be generated using the user's other parameters.

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

FIG. 8 is a block diagram of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 812 includes an encoder 808 (which can include one or more encoder layers/blocks connected in series) and a decoder 810 (which can include one or more decoder layers/blocks connected in series). Generally, the encoder 808 and the decoder 810 each include multiple neural network layers, at least one of which can be a self-attention layer. The parameters of the neural network layers can be referred to as the parameters of the language model.

The transformer 812 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. As described herein, it may take existing content from webpages or images to help in imputing missing values. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 812 is trained to perform certain functions on other input formats than natural language input. For example, the input can include objects, images, audio content, or video content, or a combination thereof. In some examples, this may be used to generate commands for authorizing and completing the transaction, for example.

The transformer 812 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 8 illustrates an example of how the transformer 812 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 8, a short sequence of tokens 802 corresponding to the input text is illustrated as input to the transformer 812. Tokenization of the text sequence into the tokens 802 can be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted to the transformer 812 can be of any length up to a maximum length defined based on the dimensions of the transformer 812. Each token 802 in the token sequence is converted into an embedding 806 (also referred to as "embedding vector").

An embedding 806 is a learned numerical representation (such as, for example, a vector) of a token that captures some semantic meaning of the text segment represented by the token 802. The embedding 806 represents the text segment corresponding to the token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 806 corresponding to the "write" token will be closer to another embedding corresponding to the "jot down" token in the vector space as compared to the distance between the embedding 806 corresponding to the "write" token and another embedding corresponding to the "summary" token.

The vector space can be defined by the dimensions and values of the embedding vectors. Various techniques can be used to convert a token 802 to an embedding 806. For example, another trained ML model can be used to convert the token 802 into an embedding 806. In particular, another trained ML model can be used to convert the token 802 into an embedding 806 in a way that encodes additional information into the embedding 806 (e.g., a trained ML model can encode positional information about the position of the token 802 in the text sequence into the embedding 806). In some implementations, the numerical value of the token 802 can be used to look up the corresponding embedding in an embedding matrix 804, which can be learned during training of the transformer 812.

The generated embeddings, e.g., such as embedding 806, are input into the encoder 808. The encoder 808 serves to encode the embedding 806 into feature vectors 814 that represent the latent features of the embedding 806. The encoder 808 can encode positional information (i.e., information about the sequence of the input) in the feature vectors 814. The feature vectors 814 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that can be generated by the encoder 808 can be referred to as a latent space or feature space.

Conceptually, the decoder 810 is designed to map the features represented by the feature vectors 814 into meaningful output, which can depend on the task that was assigned to the transformer 812. For example, if the transformer 812 is used for a translation task, the decoder 810 can map the feature vectors 814 into text output in a target language different from the language of the original tokens 802. Generally, in a generative language model, the decoder 810 serves to decode the feature vectors 814 into a sequence of tokens. The decoder 810 can generate output tokens 816 one by one. Each output token 816 can be fed back as input to the decoder 810 in order to generate the next output token 816. By feeding back the generated output and applying self-attention, the decoder 810 can generate a sequence of output tokens 816 that has sequential meaning (e.g., the resulting output text sequence is understandable as a sentence and obeys grammatical rules). The decoder 810 can generate output tokens 816 until a special [EOT] token (indicating the end of the text) is generated. The resulting sequence of output tokens 816 can then be converted to a text sequence in post-processing. For example, each output token 816 can be an integer number that corresponds to a vocabulary index. By looking up the text segment using the vocabulary index, the text segment corresponding to each output token 816 can be retrieved, the text segments can be concatenated together, and the final output text sequence can be obtained.

In some implementations, the input provided to the transformer 812 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a user device, a transmission request for acquiring a virtual resource by a user, wherein the transmission request comprises a user identifier and a virtual resource identifier; receiving, based on a virtual resource classification of the virtual resource, a set of parameterized rules from a database of parameterized rules for assessing potential vulnerability of user resources caused by a virtual resource transmission, wherein each parameterized rule comprises one or more fields for entering one or more parameters; extracting, from a user transmissions profile identified using the user identifier, user vulnerability tolerance parameters indicative of user propensity for vulnerability and, based on the virtual resource classification, virtual resource vulnerability tolerance parameters indicative of vulnerability of the virtual resource; inputting, into each parameterized rule, a corresponding user vulnerability tolerance parameter and a corresponding virtual resource vulnerability tolerance parameter to trigger execution of each parameterized rule, wherein each parameterized rule is used to determine whether the virtual resources match a transmissions profile for the user requesting the virtual resources; generating, based on the execution of each parameterized rule, a match indicator indicating whether the virtual resource matches the user transmissions profile; responsive to determining that the virtual resource does not match the user transmissions profile, triggering a temporary rejection on the transmission request requiring an override authorization from a linked user, wherein the linked user has owner access of the user transmissions profile; transmitting an authorization request to the linked user, wherein the authorization request comprises the virtual resource classification, the user identifier, and at least one user vulnerability tolerance parameter; and in response to receiving an indication of approval from the linked user, causing execution of one or more commands for completing the transmission request.

2. A method comprising: receiving, from a user device, a transmission request for acquiring a virtual resource by a user, wherein the transmission request comprises a user identifier and a virtual resource identifier; receiving, based on a virtual resource classification of the virtual resource, a set of parameterized rules from a database of parameterized rules for assessing potential vulnerability of user resources caused by a virtual resource transmission, wherein each parameterized rule comprises one or more fields for entering one or more parameters; extracting, from a user transmissions profile identified using the user identifier, user vulnerability tolerance parameters indicative of user propensity for vulnerability and, based on the virtual resource classification, virtual resource vulnerability tolerance parameters indicative of vulnerability of the virtual resource; inputting, into each parameterized rule, a corresponding user vulnerability tolerance parameter and a corresponding virtual resource vulnerability tolerance parameter to trigger execution of each parameterized rule, wherein each parameterized rule is used to determine whether the virtual resources match a transmissions profile for the user requesting the virtual resources; generating, based on execution of each parameterized rule, a match indicator indicating whether the virtual resource matches the user transmissions profile; and responsive to determining that the virtual resource does not match the user transmissions profile, triggering a temporary rejection on the transmission request requiring an override authorization from a linked user, wherein the linked user has owner access of the user transmissions profile.

3. A method comprising: receiving, from a user device, a transmission request for acquiring a virtual resource by a user, wherein the transmission request comprises a user identifier and a virtual resource identifier; receiving, based on a virtual resource classification of the virtual resource, a set of parameterized rules from a database of parameterized rules for assessing potential vulnerability of user resources caused by a virtual resource transmission, wherein each parameterized rule comprises one or more fields for entering one or more parameters; extracting, from a user transmissions profile identified using the user identifier, user vulnerability tolerance parameters indicative of user propensity for vulnerability and, based on the virtual resource classification, virtual resource vulnerability tolerance parameters indicative of vulnerability of the virtual resource; inputting, into each parameterized rule, a corresponding user vulnerability tolerance parameter and a corresponding virtual resource vulnerability tolerance parameter to trigger execution of each parameterized rule, wherein each parameterized rule is used to determine whether the virtual resources match a transmissions profile for the user requesting the virtual resources; generating, based on the execution of each parameterized rule, a match indicator indicating whether the virtual resource matches the user transmissions profile; and responsive to determining that the virtual resource does not match the user transmissions profile, triggering a temporary rejection on the transmission request requiring an override authorization from a linked user, wherein the linked user has owner access of the user transmissions profile.

4. The method of any of the preceding embodiments, further comprising: transmitting an authorization request to the linked user, wherein the authorization request comprises the virtual resource classification, the user identifier, and at least one user vulnerability tolerance parameter; and in response to receiving an indication of approval from the linked user, causing execution of one or more commands for completing the transmission request.

5. The method of any of the preceding embodiments, further comprising: receiving a notification of successful execution of the one or more commands; and updating the user vulnerability tolerance parameters of the user transmissions profile responsive to the notification by recalculating the user vulnerability tolerance parameters based on values of the virtual resource vulnerability tolerance parameters.

6. The method of any of the preceding embodiments, wherein at least one parameterized rule of the set of parameterized rules comprises a regional designation indicative of jurisdictions in which the virtual resource cannot be transmitted, and wherein the method further comprises: extracting, from the user transmissions profile, a primary user location; extracting, from the transmission request, metadata indicative of a current user location and a length of a user session on the user device; inputting, into the at least one parameterized rule, the primary user location and the metadata to determine that the virtual resource cannot be transmitted; cause execution of remaining parameterized rules of the set of parameterized rules to end; and transmitting a message of failed transmission to the user device.

7. The method of any of the preceding embodiments, further comprising: responsive to determining that a user vulnerability tolerance parameter corresponding to a parameterized rule cannot be extracted, generating a vector using other known user vulnerability tolerance parameters; inputting the vector into a machine learning model to obtain an imputed value for the user vulnerability tolerance parameter; and inserting the imputed value to the user transmissions profile with metadata indicating that the imputed value is imputed.

8. The method of any of the preceding embodiments, further comprising: accessing records for previous transmissions initiated by the user, wherein each record comprises (1) the virtual resource classification corresponding to a transmitted virtual resource, (2) the virtual resource vulnerability tolerance parameters for the transmitted virtual resource, and (3) a timestamp indicating a time at which a previous transmission was initiated; and calculating values for the user vulnerability tolerance parameters as a function of corresponding virtual resource vulnerability tolerance parameters from the previous transmissions, wherein the values for the corresponding virtual resource vulnerability tolerance parameters are weighed according to temporal proximity of the timestamp to a current time.

9. The method of any of the preceding embodiments, further comprising: identifying the virtual resource classification based on the virtual resource identifier of the transmission request, wherein the virtual resource classification identifies a class of the virtual resources to which the virtual resource identified by the virtual resource belongs; generating a request for identifying rules at the database of the parameterized rules wherein the request comprises search tags specific to the virtual resource classification; and transmitting the request for rules to the database.

10. The method of any of the preceding embodiments, wherein the instructions for generating the match indicator further comprise: obtaining, based on executing each parameterized rule, a value for a binary variable configured to be set to a first value if a virtual resource vulnerability tolerance parameter exceeds the corresponding user vulnerability tolerance parameter and a second value if a user vulnerability tolerance parameter exceeds the corresponding virtual resource vulnerability tolerance parameter; generating a data structure comprising values for binary variables corresponding to the set of parameterized rules; and based on determining that an added value of the binary variables exceeds a predetermined threshold, detecting a match.

11. One or more tangible, non-transitory, computer-readable media storing instructions that, when executed by a data processing apparatus, cause the data processing apparatus to perform operations comprising those of any of embodiments 1-10.

12. A system comprising: one or more processors; and memory storing instructions that, when executed by the one or more processors, cause the processors to effectuate operations comprising those of any of embodiments 1-10.

13. A system comprising means for performing any of embodiments 1-10.

14. A system comprising cloud-based circuitry for performing any of embodiments 1-10.

What is claimed is:

1. A system for assessing vulnerability of virtual resources, the system comprising:
one or more processors; and
one or more non-transitory computer-readable media comprising instructions that, when executed by the one or more processors, cause operations comprising:
receiving, from a user device, a transmission request for acquiring a virtual resource by a user, wherein the transmission request comprises a user identifier and a virtual resource identifier;
receiving, based on a virtual resource classification of the virtual resource, a set of parameterized rules from a database of parameterized rules for assessing potential vulnerability of user resources caused by a virtual resource transmission, wherein each parameterized rule comprises one or more fields for entering one or more parameters;
extracting, from a user transmissions profile identified using the user identifier, user vulnerability tolerance parameters indicative of user propensity for vulnerability and, based on the virtual resource classification, virtual resource vulnerability tolerance parameters indicative of vulnerability of the virtual resource;
inputting, into each parameterized rule, a corresponding user vulnerability tolerance parameter and a corresponding virtual resource vulnerability tolerance parameter to trigger execution of each parameterized rule, wherein each parameterized rule is used to determine whether the virtual resources match a transmissions profile for the user requesting the virtual resources;
generating, based on the execution of each parameterized rule, a match indicator indicating whether the virtual resource matches the user transmissions profile;
responsive to determining that the virtual resource does not match the user transmissions profile, triggering a temporary rejection on the transmission request requiring an override authorization from a linked user, wherein the linked user has owner access of the user transmissions profile;
transmitting an authorization request to the linked user, wherein the authorization request comprises the virtual resource classification, the user identifier, and at least one user vulnerability tolerance parameter; and
in response to receiving an indication of approval from the linked user, causing execution of one or more commands for completing the transmission request.

2. The system of claim 1, further comprising:
receiving a notification of successful execution of the one or more commands; and
updating the user vulnerability tolerance parameters of the user transmissions profile responsive to the notification by recalculating the user vulnerability tolerance parameters based on values of the virtual resource vulnerability tolerance parameters.

3. The system of claim 1, wherein at least one parameterized rule of the set of parameterized rules comprises a regional designation indicative of jurisdictions in which the virtual resource cannot be transmitted, and wherein the instructions further cause the one or more processors to perform operations comprising:
   extracting, from the user transmissions profile, a primary user location;
   extracting, from the transmission request, metadata indicative of a current user location and a length of a user session on the user device;
   inputting, into the at least one parameterized rule, the primary user location and the metadata to determine that the virtual resource cannot be transmitted;
   causing execution of remaining parameterized rules of the set of parameterized rules to end; and
   transmitting a message of failed transmission to the user device.

4. The system of claim 1, wherein the instructions further cause the one or more processors to perform operations comprising:
   responsive to determining that a user vulnerability tolerance parameter corresponding to a parameterized rule cannot be extracted, generating a vector using other known user vulnerability tolerance parameters;
   inputting the vector into a machine learning model to obtain an imputed value for the user vulnerability tolerance parameter; and
   inserting the imputed value to the user transmissions profile with metadata indicating that the imputed value is imputed.

5. The system of claim 1, wherein generating the match indicator indicating whether the virtual resource matches the user transmissions profile comprises:
   accessing records for previous transmissions initiated by the user, wherein each record comprises (1) the virtual resource classification corresponding to a transmitted virtual resource, (2) the virtual resource vulnerability tolerance parameters for the transmitted virtual resource, and (3) a timestamp indicating a time at which a previous transmission was initiated; and
   calculating values for the user vulnerability tolerance parameters as a function of corresponding virtual resource vulnerability tolerance parameters from the previous transmissions, wherein the values for the corresponding virtual resource vulnerability tolerance parameters are weighed according to temporal proximity of the timestamp to a current time.

6. A method for assessing vulnerability of virtual resources, the method comprising:
   receiving, from a user device, a transmission request for acquiring a virtual resource by a user, wherein the transmission request comprises a user identifier and a virtual resource identifier;
   receiving, based on a virtual resource classification of the virtual resource, a set of parameterized rules from a database of parameterized rules for assessing potential vulnerability of user resources caused by a virtual resource transmission, wherein each parameterized rule comprises one or more fields for entering one or more parameters;
   extracting, from a user transmissions profile identified using the user identifier, user vulnerability tolerance parameters indicative of user propensity for vulnerability and, based on the virtual resource classification, virtual resource vulnerability tolerance parameters indicative of vulnerability of the virtual resource;
   inputting, into each parameterized rule, a corresponding user vulnerability tolerance parameter and a corresponding virtual resource vulnerability tolerance parameter to trigger execution of each parameterized rule, wherein each parameterized rule is used to determine whether the virtual resources match a transmissions profile for the user requesting the virtual resources;
   generating, based on execution of each parameterized rule, a match indicator indicating whether the virtual resource matches the user transmissions profile; and
   responsive to determining that the virtual resource does not match the user transmissions profile, triggering a temporary rejection on the transmission request requiring an override authorization from a linked user, wherein the linked user has owner access of the user transmissions profile.

7. The method of claim 6, wherein the method further comprises:
   transmitting an authorization request to the linked user, wherein the authorization request comprises the virtual resource classification, the user identifier, and at least one user vulnerability tolerance parameter; and
   in response to receiving an indication of approval from the linked user, causing execution of one or more commands for completing the transmission request.

8. The method of claim 7, wherein the method further comprises:
   receiving a notification of successful execution of the one or more commands; and
   updating the user vulnerability tolerance parameters of the user transmissions profile responsive to the notification by recalculating the user vulnerability tolerance parameters based on values of the virtual resource vulnerability tolerance parameters.

9. The method of claim 6, wherein at least one parameterized rule of the set of parameterized rules comprises a regional designation indicative of jurisdictions in which the virtual resource cannot be transmitted, and wherein the method further comprises:
   extracting, from the user transmissions profile, a primary user location;
   extracting, from the transmission request, metadata indicative of a current user location and a length of a user session on the user device;
   inputting, into the at least one parameterized rule, the primary user location and the metadata to determine that the virtual resource cannot be transmitted;
   causing execution of remaining parameterized rules of the set of parameterized rules to end; and
   transmitting a message of failed transmission to the user device.

10. The method of claim 6, further comprising:
    responsive to determining that a user vulnerability tolerance parameter corresponding to a parameterized rule cannot be extracted, generating a vector using other known user vulnerability tolerance parameters;
    inputting the vector into a machine learning model to obtain an imputed value for the user vulnerability tolerance parameter; and
    inserting the imputed value to the user transmissions profile with metadata indicating that the imputed value is imputed.

11. The method of claim 6, further comprising:
    accessing records for previous transmissions initiated by the user, wherein each record comprises (1) the virtual resource classification corresponding to a transmitted virtual resource, (2) the virtual resource vulnerability tolerance parameters for the transmitted virtual resource, and (3) a timestamp indicating a time at which a previous transmission was initiated; and calculating values for the user vulnerability tolerance parameters as a function of corresponding virtual resource vulnerability tolerance parameters from the previous transmissions, wherein the values for the corresponding virtual resource vulnerability tolerance parameters are weighed according to temporal proximity of the timestamp to a current time.

12. The method of claim 6, further comprising:

identifying the virtual resource classification based on the virtual resource identifier of the transmission request, wherein the virtual resource classification identifies a class of the virtual resources to which the virtual resource identified by the virtual resource belongs;

generating a request for identifying rules at the database of the parameterized rules wherein the request comprises search tags specific to the virtual resource classification; and transmitting the request for rules to the database.

13. One or more non-transitory, computer-readable media comprising instructions recorded thereon that, when executed by one or more processors, cause operations for assessing vulnerability of virtual resources, comprising:

receiving, from a user device, a transmission request for acquiring a virtual resource by a user, wherein the transmission request comprises a user identifier and a virtual resource identifier;

receiving, based on a virtual resource classification of the virtual resource, a set of parameterized rules from a database of parameterized rules for assessing potential vulnerability of user resources caused by a virtual resource transmission, wherein each parameterized rule comprises one or more fields for entering one or more parameters;

extracting, from a user transmissions profile identified using the user identifier, user vulnerability tolerance parameters indicative of user propensity for vulnerability and, based on the virtual resource classification, virtual resource vulnerability tolerance parameters indicative of vulnerability of the virtual resource;

inputting, into each parameterized rule, a corresponding user vulnerability tolerance parameter and a corresponding virtual resource vulnerability tolerance parameter to trigger execution of each parameterized rule, wherein each parameterized rule is used to determine whether the virtual resources match a transmissions profile for the user requesting the virtual resources;

generating, based on the execution of each parameterized rule, a match indicator indicating whether the virtual resource matches the user transmissions profile; and responsive to determining that the virtual resource does not match the user transmissions profile, triggering a temporary rejection on the transmission request requiring an override authorization from a linked user, wherein the linked user has owner access of the user transmissions profile.

14. The one or more non-transitory, computer-readable media of claim 13, wherein the instructions further cause the one or more processors to perform:

transmitting an authorization request to the linked user, wherein the authorization request comprises the virtual resource classification, the user identifier, and at least one user vulnerability tolerance parameter; and in response to receiving an indication of approval from the linked user, causing execution of one or more commands for completing the transmission request.

15. The one or more non-transitory, computer-readable media of claim 14, wherein the instructions further cause the one or more processors to perform operations comprising:

receiving a notification of successful execution of the one or more commands; and updating the user vulnerability tolerance parameters of the user transmissions profile responsive to the notification by recalculating the user vulnerability tolerance parameters based on values of the virtual resource vulnerability tolerance parameters.

16. The one or more non-transitory, computer-readable media of claim 13, wherein at least one parameterized rule of the set of parameterized rules comprises a regional designation indicative of jurisdictions in which the virtual resource cannot be transmitted, and wherein the instructions further cause the one or more processors to perform operations comprising:

extracting, from the user transmissions profile, a primary user location;

extracting, from the transmission request, metadata indicative of a current user location and a length of a user session on the user device;

inputting, into the at least one parameterized rule, the primary user location and the metadata to determine that the virtual resource cannot be transmitted;

causing execution of remaining parameterized rules of the set of parameterized rules to end; and transmitting a message of failed transmission to the user device.

17. The one or more non-transitory, computer-readable media of claim 13, wherein the instructions further cause the one or more processors to perform operations comprising:

responsive to determining that a user vulnerability tolerance parameter corresponding to a parameterized rule cannot be extracted, generating a vector using other known user vulnerability tolerance parameters;

inputting the vector into a machine learning model to obtain an imputed value for the user vulnerability tolerance parameter; and inserting the imputed value to the user transmissions profile with metadata indicating that the imputed value is imputed.

18. The one or more non-transitory, computer-readable media of claim 13, wherein the instructions further cause the one or more processors to perform operations comprising:

accessing records for previous transmissions initiated by the user, wherein each record comprises (1) the virtual resource classification corresponding to a transmitted virtual resource, (2) the virtual resource vulnerability tolerance parameters for the transmitted virtual resource, and (3) a timestamp indicating a time at which a previous transmission was initiated; and calculating values for the user vulnerability tolerance parameters as a function of corresponding virtual resource vulnerability tolerance parameters from the previous transmissions, wherein the values for the corresponding virtual resource vulnerability tolerance parameters are weighed according to temporal proximity of the timestamp to a current time.

19. The one or more non-transitory, computer-readable media of claim 13, wherein the instructions further cause the one or more processors to perform operations comprising:

identifying the virtual resource classification based on the virtual resource identifier of the transmission request, wherein the virtual resource classification identifies a class of the virtual resources to which the virtual resource identified by the virtual resource belongs;

generating a request for identifying rules at the database of the parameterized rules wherein the request comprises search tags specific to the virtual resource classification; and transmitting the request to the database.

20. The one or more non-transitory, computer-readable media of claim 13, wherein the instructions for generating the match indicator further cause the one or more processors to perform operations comprising:

obtaining, based on executing each parameterized rule, a value for a binary variable configured to be set to a first value if a virtual resource vulnerability tolerance parameter exceeds the corresponding user vulnerability tolerance parameter and a second value if a user vulnerability tolerance parameter exceeds the corresponding virtual resource vulnerability tolerance parameter;

generating a data structure comprising values for binary variables corresponding to the set of parameterized rules; and based on determining that an added value of the binary variables exceeds a predetermined threshold, detecting a match.

* * * * *